June 5, 1951

B. A. FAIRBANK 2,555,585

METHOD OF PACKAGING

Filed Jan. 5, 1949

INVENTOR.
Benjamin A. Fairbank
BY
Theodore C. Browne
Attorney

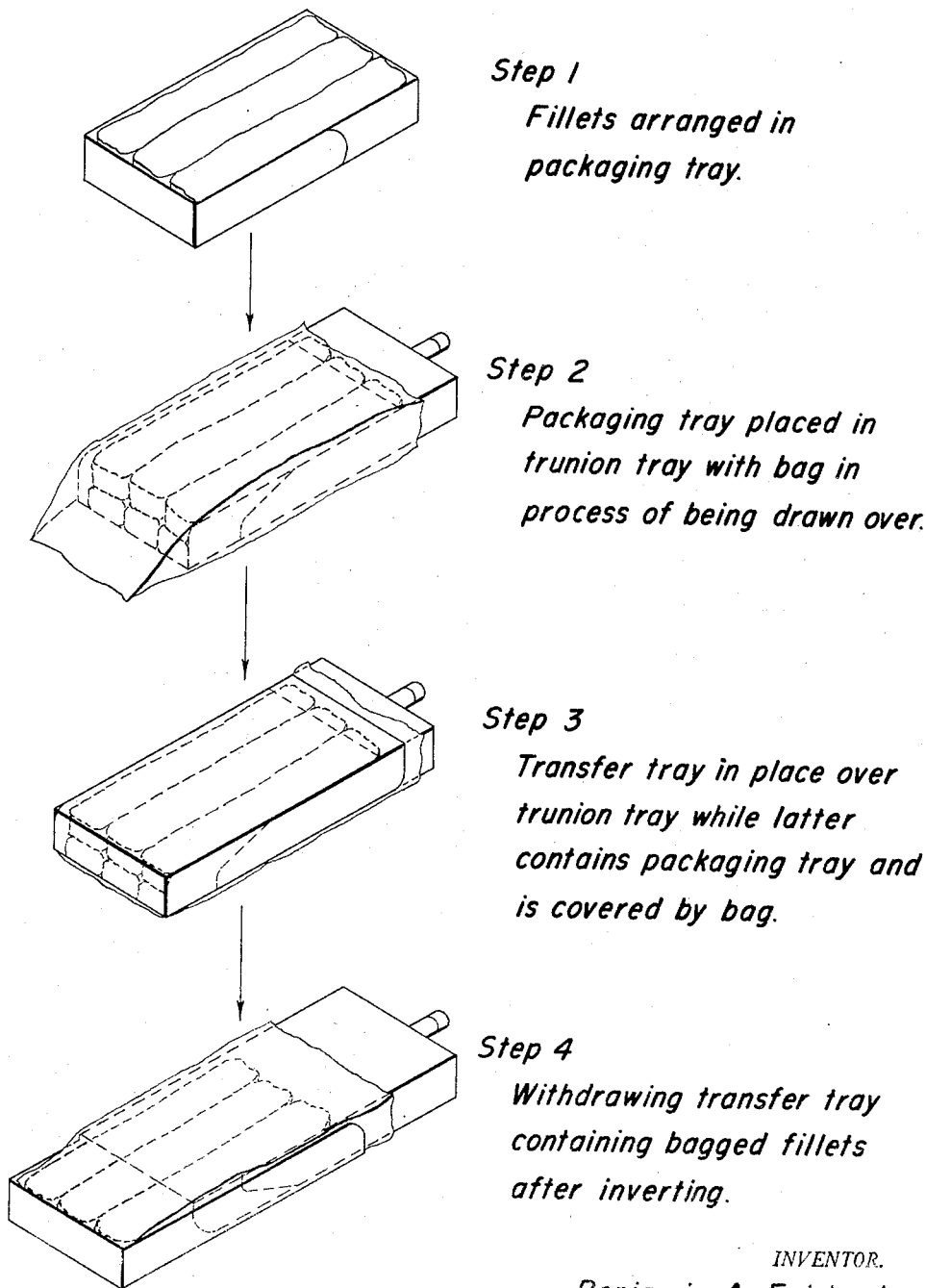

Patented June 5, 1951

2,555,585

UNITED STATES PATENT OFFICE 2,555,585

METHOD OF PACKAGING

Benjamin A. Fairbank, Cambridge, Mass., assignor to Dewey and Almy Chemical Company, North Cambridge, Mass., a corporation of Massachusetts Application January 5, 1949, Serial No. 69,376

1 Claim. (Cl. 99—171)

A particularly satisfactory type of protection for frozen foodstuffs consists of a bag, usually made of rubber or some other elastomeric polymer which is impermeable to moisture. These bags are partially evacuated and hermetically sealed after the foodstuff has been inserted. In the best practice, the bags are stretched and are unstable to a rise in temperature, so that superficial heating causes the bag to shrink tightly against the foodstuff.

In this way, the foodstuff is surrounded by an impermeable, protective second skin which excludes air from contact with the food and prevents the transfer from the food of the natural moisture which the food contains. The shrunk coverings, besides being essentially wrinkle free, reduce the tendency of the fat-containing portions of the food to become rancid. They are particularly valuable in fish packing where the oils and fats of such sensitive fish as salmon and sword-fish become rancid with great rapidity. The use of such bags on whole chickens, roasts and other meat cuts proceeds without difficulty, but the packaging of fish presents a difficult problem because a fillet of fresh fish is a floppy, almost formless substance.

It has become customary to supply fish to the retailers in boxes of say 5, 10, or 20 lbs. of frozen fish. Packing frozen lumps of fish of assorted shapes and sizes is uneconomical and requires considerable skill and judgment on the part of the packer. It is the object of this invention to produce packages of fish, particularly fresh filleted fish of uniform size so that the packages may be inserted into the shipping containers or merchants' package by automatic machinery, or so that the package may be overwrapped in sheets of standard dimensions without finding that the overwrapping is too large or too small. My invention makes possible the production of such uniformly sized bag-protected blocks of frozen fish.

It has also become customary to wrap one pound of fish fillets in a sheet of paper or cellophane since this makes the rapid handling of fish a possibility at the time of its retail sale. In the trade these loose wrapped pounds of fish are known as "sticks." My invention contemplates the use of and the packaging of such "sticks" as well as the mass packing of fish fillets in commercial packages.

The new fish packing process consists essentially of arranging the fillets or cuts of fish in a rigid tray having the dimension desired for the finished package. This tray is arranged so that the packaged material may be slid out without being lifted. The tray and the material are inserted in a bag. The assembly is covered by a pan having slightly larger dimensions than the tray and the entire assembly is inverted. The tray is slid out of the bag, leaving the fillets enclosed in the bag and supported by the pan. The bag may then be sealed.

I find it most convenient in carrying out this method to use specially designed tools in proper sequence. These tools are the packaging tray, the trunnion tray and the transfer pan. Using these tools the packaging process consists in arranging fillets or cuts of fish in the packaging tray, inserting this tray filled with fish in the trunnion tray, drawing the bag over both trays and then placing the transfer pan over the assembly. The whole assembly is then turned upside down in the trunnion so that the bagged fish is supported by the transfer tray, and then the package is evacuated and sealed. In this way a precisely sized package is produced.

Figure 4 shows diagrammatically the individual steps of the packaging method.

Figure 1:
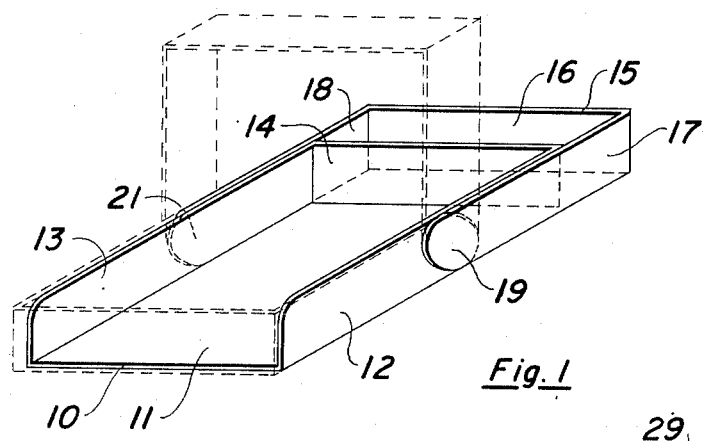
Figure 1 shows the packaging tray for the packing of fish fillets.
Figure 2:
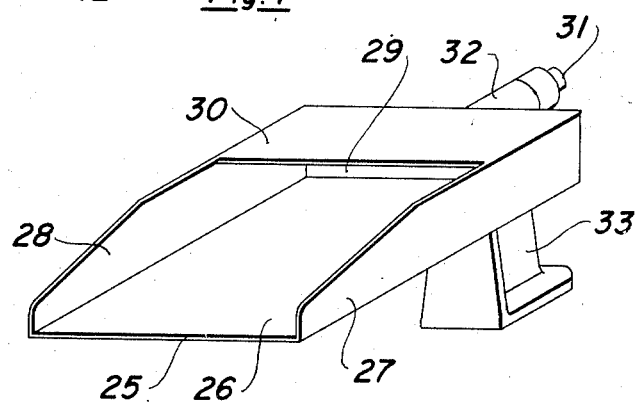
Figure 2 shows the trunnion tray.
Figure 3:
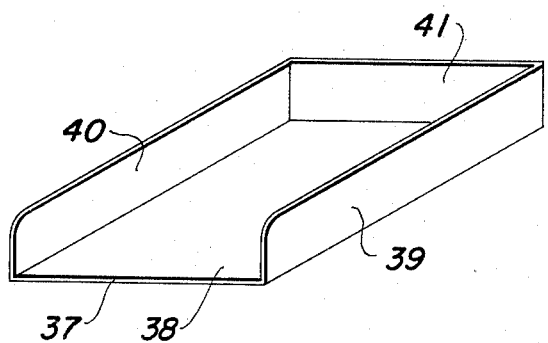
Figure 3 shows the transfer pan.

The packaging tray 10 consists of a floor 11 having upstanding side walls 12 and 13 and end wall 14. The gate 15 consists of an end wall 16 and support arms 17 and 18. The arms are bent back to lie normally against the upstanding side walls 12 and 13 of the tray. The gate is journaled to the side walls, 12 and 13, at the points 19 and 21 as shown. Gate 15 is thus adapted to swing over the top of the tray. When in its closed position the end portion 16 acts as the remaining end wall of tray 10. When the gate 15 is in its open position indicated by solid lines in Figure 1, the end portion 16 lies beyond the end 14 of the packaging tray 10, the extent of the overlap being determined by the position of the journal points 19 and 21. The size of the tray may vary widely for it is determined solely by the average dimensions of the fish or foodstuff which is to be packaged.

The trunnion tray 25, a rotatable fixture, consists of a floor 26 and upstanding side walls 27 and 28, and end wall 29 and a top 30 which covers only a portion of the upper open area. Its dimensions are approximately those of the packaging tray but slightly larger so that the packaging tray may easily be placed within the trunnion tray. A trunnion 31 is attached to the end wall 29 at its midpoint. Trunnion 31 is adapted to slide into an appropriate bearing 32 fashioned in a supporting standard 33 which usually is attached to the top of a table or packing bench. The standard is made high enough so that the trays may be rotated about the trunnion easily without fouling the table surface or cramping the hands of the operator.

The transfer pan 37 consists of a floor 38 and upstanding side walls 39 and 40 and an end wall 41. Its size is just sufficiently larger than that of the trunnion tray to fit over it comfortably.

As the specific example of packaging, I shall describe the packaging of 1-lb. packages of fish fillets, but it is understood that fish fillets without a paper overwrapping or cuts or pieces of indefinite shape can be handled in the same manner. The sticks of fish fillets are placed lengthwise in the packaging tray 10 while the gate 15 is lowered to its closed position, as shown in step 1. When the tray has been filled with the desired number of sticks, the gate 15 is swung up to its open position. The packaging tray 10 is then slid into the trunnion tray 25 with the end portion 16 of the open gate 15 pointing toward end 29 of the trunnion tray 25. The space between the end portion 16 of the gate 15 and the end 14 of the tray 10 lies within the cover portion 30 of the trunnion tray 25. Then as shown in step No. 2, an empervious bag is slid over the trunnion tray 25. At this point, the transfer pan 37 is placed upside down over the bag and over the trunnion tray 25 with its closed end 41 pointed toward the operator and away from the trunnion 31 as illustrated in step 3. The operator then grasps the trays at the sides and rotates the entire combination about the trunnion 31 one half of a revolution. At the end of this operation, the transfer pan lies on the bottom of the assembly with its wall in upright position. The bag lies between the trunnion tray 25 and the transfer pan 37. The operator then lowers the transfer pan 37 slightly and draws it in a direction away from the trunnion 31 (illustrated in step 4). Since the weight of the fish is now supported by the floor 38 of the transfer pan 37, it carries the bag with it as the tray is being drawn away. The operator then places the transfer pan in front of the sealing machine where the open ends of the bag are drawn over the nozzle and the bag is slid between heat-sealing jaws. After sufficient air has been evacuated from the bag, the heat-sealing jaws are lowered, and the bag, made of a heat-sealable plastic material, is sealed across the end.

Forming the package in the pans gives sufficient rigidity to the fish so that the latter operations may be performed either while the fish is supported by the transfer pan or after the bag has been removed from the pan as the operator elects. In either case, the size and shape of the package is accurately maintained. The bagged fish may now pass on to the freezer. After freezing it will be found that the frozen blocks are sufficiently uniform so that there is no difficulty in placing them in shipping containers or overwrapping them as may be desired.

I claim:

The method of packaging filleted fish in impermeable envelopes and of producing uniform packages thereof suitable for quick-freezing which consists in arranging the fish in a rigid supporting structure, removing one wall of the structure, placing the structure in a rotatable fixture with the open end of the structure directed away from said fixture, sliding an impermeable bag over both fixture and supporting structure, placing a second rigid supporting structure over said fixture, bag and supporting structure, rotating the entire assembly one-half a revolution about the axis of the fixture whereby the bag and its contained load is supported by the second named supporting structure, then withdrawing said second named supporting structure from the fixture and first named supporting structure and subsequently sealing the bag while retaining the shape of the package.

BENJAMIN A. FAIRBANK.

REFERENCES CITED

The following references are of record in the file of this patent:

UNITED STATES PATENTS

| Number | Name | Date |
|---|---|---|
| 1,710,386 | Taylor | Apr. 23, 1929 |
| 1,773,080 | Birdseye | Aug. 12, 1930 |
| 2,110,410 | Westley et al. | Mar. 8, 1938 |
| 2,374,452 | Noyes | Apr. 24, 1945 |